United States Patent
Bach et al.

(10) Patent No.: US 12,421,116 B2
(45) Date of Patent: Sep. 23, 2025

(54) PHOSPHATE-CONTAINING ANTI-CORROSIVE PIGMENT

(71) Applicant: Chemische Fabrik Budenheim KG, Budenheim (DE)

(72) Inventors: Sven Bach, Hohenstein (DE); Laura Erbach, Argenschwang (DE); Birgit Faßbender, Mainz (DE); Thomas Futterer, Ingelheim (DE); David Garcia Martinez, Saragossa (ES); Christian Litterscheid, Ober-Olm (DE); Stefan Mallmann, Heidesheim (DE); Siegfried Mengel, Frei-Laubersheim (DE); Sebastian Moschel, Groß-Gerau (DE); Mikel Schöller, Bingen (DE); Hendrik Wermter, Eltville (DE); Rüdiger Wissemborski, Neuruppin (DE)

(73) Assignee: Chemische Fabrik Budenheim KG, Budenheim (DE)

(*) Notice: Subject to any disclaimer, the term of this patent is extended or adjusted under 35 U.S.C. 154(b) by 0 days.

(21) Appl. No.: 17/784,555

(22) PCT Filed: Dec. 7, 2020

(86) PCT No.: PCT/EP2020/084914
§ 371 (c)(1),
(2) Date: Jun. 10, 2022

(87) PCT Pub. No.: WO2021/116030
PCT Pub. Date: Jun. 17, 2021

(65) Prior Publication Data
US 2025/0263298 A1    Aug. 21, 2025

(30) Foreign Application Priority Data

Dec. 12, 2019 (DE) .................. 10 2019 134 205.8
Mar. 20, 2020 (DE) .................. 10 2020 107 797.1

(51) Int. Cl.
*C01B 25/32* (2006.01)
*C08K 3/32* (2006.01)
*C09D 5/08* (2006.01)

(52) U.S. Cl.
CPC .............. *C01B 25/321* (2013.01); *C08K 3/32* (2013.01); *C09D 5/084* (2013.01); *C08K 2003/321* (2013.01); *C08K 2201/006* (2013.01)

(58) Field of Classification Search
CPC .............................. C01B 25/321; C08K 3/32
See application file for complete search history.

(56) References Cited

U.S. PATENT DOCUMENTS

| 4,294,621 A | 10/1981 | Maurer et al. |
| 5,405,436 A | 4/1995 | Maurer et al. |
| 5,665,149 A | 9/1997 | Gotzmann et al. |

FOREIGN PATENT DOCUMENTS

| DE | 198 07 808 A1 | 9/1999 | |
| EP | 0017784 A1 | 10/1980 | |
| EP | 0718377 A1 | 6/1996 | |
| JP | 55-142057 A | 11/1980 | |
| JP | H-0543212 A | 2/1993 | |
| JP | 06-206712 A | 7/1994 | |
| JP | 2000-053406 A | 2/2000 | |
| JP | 2002-504615 A | 2/2002 | |
| JP | 2002-080210 A | 3/2002 | |
| WO | WO-9943757 A1 * | 9/1999 | ............. C09D 5/084 |
| WO | 2007/120810 A2 | 10/2007 | |

OTHER PUBLICATIONS

WO1999043757 machine translation, pp. 1-5 (Year: 1999).*
International Search Report and Written Opinion mailed Mar. 11, 2021 for PCT/EP2020/084914 (with English translation of International Search Report only).
Search Report dated May 15, 2020 for DE 10 2019 134 205.8.

\* cited by examiner

*Primary Examiner* — Andrew S Rosenthal
(74) *Attorney, Agent, or Firm* — MEDLER FERRO WOODHOUSE & MILLS PLLC (57) ABSTRACT

The present invention relates to a method for producing a phosphate-containing anti-corrosive pigment, to the phosphate-containing anti-corrosive pigment obtainable by this method, and to the use of the phosphate-containing anti-corrosive pigment for passive protection against corrosion.

14 Claims, 7 Drawing Sheets

PHOSPHATE-CONTAINING ANTI-CORROSIVE PIGMENT

CROSS-REFERENCE TO RELATED APPLICATIONS

This application is a National Stage of International Application No. PCT/EP2020/084914 filed on Dec. 7, 2020, which claims benefit of German Patent Application No. 10 2019 134 205.8 filed Dec. 12, 2019 and German Patent Application No. 10 2020 107 797.1 filed Mar. 20, 2020, each of which are herein incorporated by reference in their entirety.

TECHNICAL FIELD

The present invention relates to a method for producing a phosphate-containing anti-corrosion pigment, to the phosphate-containing anti-corrosion pigment obtainable by this method, and to the use of the phosphate-containing anti-corrosion pigment for passive corrosion protection.

BACKGROUND

Anti-corrosion pigments are regularly added to coating agents for painting metal parts in order to prevent atmospheric corrosion of the metal parts. Currently, zinc dust and zinc phosphate are the most important anti-corrosion pigments.

However, the use of these heavy-metal-containing anti-corrosion pigments is increasingly restricted due to ecological concerns, in particular due to the water toxicity of the compounds, so that there were already initial efforts to provide anti-corrosion pigments that contain lower amounts of heavy metals or are even free of heavy metals.

For example, JPH-0 543 212 relates to a phosphate-containing pigment for corrosion protection, which pigment comprises apatite and other slightly soluble metal phosphates, wherein the slightly soluble metal phosphates are selected from the group consisting of calcium, magnesium, barium, zinc, cerium, nickel, tin, copper, or aluminium phosphates or pyrophosphates. In order to produce the pigment, apatite is first precipitated from a mixture of lime milk and phosphoric acid, whereby an apatite powder having a primary particle size in the sub-μm range is obtained. The apatite powder is subsequently physically mixed with the slightly soluble metal phosphate in a Henschel mixer.

Since the apatite powder and the slightly soluble metal phosphate are only physically mixed, the distribution of the slightly soluble metal phosphate in the pigment is uneven. The extent of the synergistic effect resulting from the cooperation of the various metal phosphates is therefore limited. Moreover, since the apatite powder and the slightly soluble metal phosphate have different solubilities, individual areas of the pigment dissolve away sooner upon reaction with water, whereby a coating layer comprising the pigment can quickly become porous.

In Example 2, DE 198 07 808 A1 describes the production of an anti-corrosion pigment starting from $Ca(OH)_2$, $Mg(OH)_2$, and phosphoric acid. The three components are suspended in water, stirred at 60° C. for 1.5 hrs and the resulting product is filtered off. The simultaneous precipitation results in mixed metal phosphates that have a homogeneous distribution of the various metal ions.

However, not only is even distribution of the various metals necessary for the use of mixed metal, phosphate-containing anti-corrosion pigments, but it is furthermore desired that the phosphate-containing anti-corrosion pigments can also be introduced into the coating at the highest possible concentrations. To this end, the anti-corrosion pigments must have the lowest possible oil absorption value.

The oil absorption value or oil absorption is an important pigment property and provides a statement about the behaviour of the pigment during dispersion. The oil demand indicates the amount of oil with which a defined amount of the powder to be tested is to be moistened in order to achieve a stiff, non-flowing putty-like paste. The higher the oil absorption value, the more oil is needed to evenly disperse the anti-corrosion pigment in the coating. This means that in the case of a high oil absorption value, only a small amount of anti-corrosion pigment can be introduced into the coating. The oil absorption value is determined in accordance with DIN EN ISO 787-5. In principle, as the specific surface area increases, more oil is needed to disperse the same amount of anti-corrosion pigment, i.e., the oil absorption value increases.

However, the above phosphate-containing anti-corrosion pigments produced by conventional precipitation reactions comprise very fine, needle-shaped primary particles in the sub-μm range so that their specific surface area is well above 10 $m^2/g$. As a result, the phosphate-containing anti-corrosion pigments obtained therefrom have a relatively high oil absorption value of >30 g/100 g, usually significantly >40 g/100 g.

In light of the above, it is the object of the present invention to provide a method for producing a phosphate-containing anti-corrosion pigment having a lower oil absorption value than the anti-corrosion pigments known from the prior art.

SUMMARY

The object of the present invention is achieved by providing a method of producing a phosphate-containing anti-corrosion pigment, comprising the following steps:
a) providing hydroxyapatite or calcium-magnesium-phosphate particles or mixtures of the aforementioned as start particles in an aqueous solvent or dispersant,
b) adding lime milk, a magnesium compound, and phosphoric acid to the aqueous solvent or dispersant in order to produce a reaction mixture,
c) reacting the reaction mixture to form the phosphate-containing anti-corrosion pigment
   at a temperature in the range of 20° C. to 105° C. and
   at a pH value in the range of 6.0 to 13.0,
d) separating at least a part of the phosphate-containing anti-corrosion pigment from the aqueous solvent or dispersant,
e) Optionally: drying the phosphate-containing anti-corrosion pigment.

Step a)

In the first step of the reaction, hydroxyapatite particles or calcium-magnesium-phosphate particles or mixtures of the aforementioned are provided as start particles in an aqueous solvent or dispersant. The term "hydroxyapatite" includes powdered materials comprising at least 95 wt % of $Ca_5(PO_4)_3OH$, as well as calcium-deficient hydroxyl apatite, i.e., powdered materials comprising at least 95 wt % of material of the formula $Ca_{10-x}(PO_4)_{6-x}(HPO_4)_x(OH)_{2-x}$, where $0<x\leq2$. The term thus includes not only powders whose particles consist of 100 wt % of pure hydroxyapatite and/or pure calcium-deficient hydroxyapatite but also powders that, for example, comprise a proportion of solid crystals of pure or pure calcium-deficient hydroxyapatite with, e.g., dolomite, as long as the total proportion of $Ca_5(PO_4)_3OH$ and/or $Ca_{10-x}(PO_4)_{6-x}(HPO_4)_x(OH)_{2-x}$, where $0<x\leq 2$, is at least 95 wt % of the powder.

Preferred hydroxyapatite powders according to the present invention consist of at least 95 wt %, preferably at least 97 wt %, more preferably at least 98 wt %, or most preferably at least 99 wt % of $Ca_5(PO_4)_3OH$ and/or $Ca_{10-x}(PO_4)_{6-x}(HPO_4)_x(OH)_{2-x}$, where $0<x\leq 2$.

The start particle serves as a crystal nucleus on which the reaction product of reaction step c) grows as a calcium-magnesium-phosphate layer. Prior to growing, the start particles generally have a grain size median <0.1 µm, a bulk density in the range of 200 to 350 g/L, an aspect ratio >5, and a specific surface area in the range of 15 to 50 m²/g. By growing, primary particles with a greater median and a lower aspect ratio are obtained.

The grain size median may be determined using laser scatter analysis in accordance with DIN ISO 13320-1. The aspect ratio expressing the ratio of the largest average extent of the particles in a first dimension to the smallest average extent of the particles in a second dimension may be determined by optical analysis. In this case, the largest extent of the particles in a first dimension and the smallest extent of the particles in a second dimension are measured for a fraction of the powder under the scanning electron microscope and the statistical mean (arithmetic mean) of the respective values are used to form the ratio.

In a preferred embodiment of the invention, the start particles are provided in the solvent or dispersant at a concentration that is >10 wt %, more preferably >15 wt %, even more preferably >20 wt %, and most preferably >25 wt %. A high concentration of start particles ensures that the proportion of phosphate-containing anti-corrosion pigment that arises in step c) by growing on the start particles and not by free precipitation in the solvent or dispersant is as high as possible. As a result, the advantages associated with the invention can be maximized.

By decreasing the aspect ratio, preferably in a range <5, and/or increasing the particle size median, preferably in a range >0.1 µm, the specific surface area of the phosphate-containing anti-corrosion pigment can be significantly reduced. The specific surface area of the phosphate-containing anti-corrosion pigment is preferably ≤10 m²/g, more preferably ≤8 m²/g, and most preferably ≤7 m²/g.

Based on its total weight, the aqueous solvent or dispersant comprises at least 20% water, preferably at least 40%, particularly preferably at least 50%, more preferably at least 70%, and most preferably at least 90%. In a further embodiment, the aqueous solvent or dispersant consists of water. The solvent or dispersant may comprise, as a further constituent, polar organic solvents, such as (polyvalent) alcohols or amines. Particularly preferred as further constituents are polyvalent alcohols.

The specific surface area is determined by BET measurement based on the absorption of nitrogen in accordance with DIN ISO 9277. As already mentioned, the smallest possible specific surface area for the phosphate-containing anti-corrosion pigment according to the invention is desired and advantageous in order to keep the oil absorption value as low as possible.

Step b)

According to the present invention, in method step b), the lime milk, the magnesium compound, and the phosphoric acid may be added sequentially, wherein the time interval when adding the reactants should be as small as possible.

Preferably, lime milk, magnesium compound, and phosphoric acid are added at least partially simultaneously to the aqueous solvent or dispersant, wherein the magnesium compound is preferably added dissolved or suspended in an aqueous solvent or dispersant. This allows for an even distribution of calcium and magnesium in the calcium-magnesium-phosphate layer grown on the hydroxyapatite start particle. Particularly preferred is the nearly entirely simultaneous addition of lime milk, magnesium compound, and phosphoric acid. This means that ≥95% of the masses of the respective components added in step b) are added simultaneously.

In one embodiment of the invention, the addition in step b) can take place by the lime milk, magnesium compound, and phosphoric acid being each separately added to the suspension of start particles. In this case, the magnesium compound is particularly preferably added as an aqueous dispersion. The addition preferably takes place at least partially or even nearly entirely simultaneously. In this context, nearly entirely simultaneously means that ≥95% of the added masses of the respective components are added simultaneously.

In a further embodiment of the invention, the magnesium compound is dissolved or suspended in the lime milk prior to the addition to the suspension of start particles, so that lime milk and magnesium compound are added together to the suspension of start particles. This ensures an even distribution of calcium and magnesium in the calcium-magnesium-phosphate layer, grown on the start particle, in the anti-corrosion pigment.

In a further embodiment of the invention, the magnesium compound is dissolved or suspended in the phosphoric acid prior to the addition to the suspension of start particles, so that magnesium compound and phosphoric acid are added together to the suspension of start particles. This has the advantage that the magnesium compound is already evenly distributed during the addition to the suspension of the start particles, so that there is an even distribution of calcium and magnesium in the calcium-magnesium-phosphate layer grown on the start particle.

In a further embodiment of the invention, the lime milk is dissolved or suspended in the phosphoric acid prior to the addition to the suspension of start particles, so that lime milk and phosphoric acid are added together to the suspension of start particles. This has the advantage that the magnesium compound is already evenly distributed during the addition to the suspension of the start particles, so that there is an even distribution of calcium and magnesium in the calcium-magnesium-phosphate layer grown on the start particle.

Step c)

The reaction of the lime milk with the phosphoric acid should be as even and controlled as possible. For the success of the present invention, it is therefore critical that the temperature in the reaction mixture is above 20° C. and below 105° C. In preferred embodiments of the invention, the reaction in step c) takes place at a temperature in the range of 60 to 105° C., preferably in the range of 80 to 105° C., more preferably in the range of 90 to 105° C., and most preferably in the range of 100 to 105° C.

For the success of the present invention, it is also critical that the pH value is in the range of 6.0 to 13.0. At a pH value <6.0, calcium hydrogen phosphate ($CaHPO_4$) or calcium hydrogen phosphate dihydrate ($CaHPO_4 \cdot 2\ H_2O$) precipitates. In a preferred embodiment of the invention, the pH value in step c) is in the range of 7.0 to 11.0 since $Ca(OH)_2$ can increasingly occur as a minor phase under certain conditions above pH 11.0. In an alternative embodiment of the invention, step c) takes place at a pH value in the range of 7.0 to 9.0 since inclusions of $Ca(OH)_2$ can at least partially occur under certain conditions above pH 9.0.

In a certain embodiment of the invention, the reaction in step c) is carried out at atmospheric pressure. If desired, however, the work can be done even at slightly increased pressure, preferably up to a positive pressure of 1 bar.

Step d)

In step d) of the method according to the invention, at least a part of the phosphate-containing anti-corrosion pigment is separated from the suspension. This can be done using common separation methods. Particularly preferably, the separation method is selected from the group consisting of filtration, evaporation, centrifugation, sedimentation, and flotation.

In a preferred embodiment of the invention, the separated phosphate-containing anti-corrosion pigment is washed with water or an aqueous solvent.

Step e)

In step e), the phosphate-containing anti-corrosion pigment separated from the suspension is dried. This can take place using common drying methods preferably selected from the group consisting of convective drying, microwave drying, spray drying, or vacuum drying.

The advantages claimed for the present invention are already achieved if the method steps a) to d) or a) to e) are repeated only once. However, even better results can be achieved if these method steps are repeated at least twice, preferably at least three times, and most preferably at least five times. As a result, the extent of the growth on the start particles is increased and phosphate-containing anti-corrosion pigments with a greater median and/or lower aspect ratio are obtained. The phosphate-containing anti-corrosion pigments therefore have a lower specific surface area and thus a lower oil absorption value. By repeating the growing process, the person skilled in the art can therefore further reduce the specific surface area and the oil absorption value of the pigment.

In a preferred embodiment of the invention, the median of the primary particles of the phosphate-containing anti-corrosion pigment is >0.10 μm, preferably >0.15 μm, particularly preferably >0.20 μm, and most preferably >0.25 μm.

In a preferred embodiment of the invention, the aspect ratio of the primary particles of the phosphate-containing anti-corrosion pigment is <5, preferably <4, particularly preferably <3, and most preferably <2.

By repeating the growing step several times, a higher degree of growing is achieved, i.e., the proportion of start particles in the total proportion of the phosphate-containing anti-corrosion pigment is reduced and the advantages according to the invention are enhanced.

In a preferred embodiment of the invention, the method steps a) to d) or a) to e) are repeated until the proportion of start particles in the phosphate-containing anti-corrosion pigment is <50 wt %, preferably <40 wt %, more preferably <30 wt %, and most preferably <25 wt %. Particularly preferred is this repetition if the start particles consist of hydroxyapatite or have a weight proportion of hydroxyapatite >50%, preferably >70%, more preferably >80%, and most preferably >90%.

In a preferred embodiment of the invention, the magnesium compound is selected from the group consisting of magnesium oxide, hydroxide, carbonate, or phosphate, wherein phosphate also comprises condensed phosphates, pyrophosphates, and condensed pyrophosphates.

In a preferred embodiment of the invention, the added chlorine and/or sulphate content of hydroxyapatite start particles, lime milk, magnesium compound, and phosphoric acid is ≤1000 ppm, preferably ≤500 ppm. Chlorine and sulphate ions accelerate the corrosion process of metal components and therefore counteract the effect of corrosion protection. The content of chlorine and sulphate ions in the phosphate-containing anti-corrosion pigment is therefore to be kept as low as possible.

In one embodiment of the invention, the method is carried out in semi-continuous operation, wherein that proportion of the phosphate-containing anti-corrosion pigment separated in method step d) that in the dried state has a median of the primary particles of >0.10 μm is always removed from the process, while the remaining proportion is again suspended in the aqueous solvent or dispersant in method step a).

In an alternative embodiment of the invention, the method is carried out in fully continuous operation, wherein in method step d), that proportion of phosphate-containing anti-corrosion pigment that in the dried state has a median of the primary particles of >0.10 μm is continuously separated and removed from the method cycle, while the remaining proportion continues to remain in the method cycle. The continuous separation and removal preferably takes place with a lamella thickener or a centrifuge (e.g.: inverting centrifuge or pusher centrifuge).

In a certain embodiment, start particles with a median of <0.1 μm are used in method step a) and method steps a) to d) or a) to e) are repeated at least once in order to obtain a phosphate-containing anti-corrosion pigment whose primary particles have a median of >0.10 μm and an aspect ratio of <5, wherein the specific surface area of the phosphate-containing anti-corrosion pigment is ≤10 $m^2$/g and the bulk density is >550 g/L.

In a particular embodiment of the invention, the method is carried out in continuous operation, wherein a proportion of the phosphate-containing anti-corrosion pigment separated in method step d) whose primary particles have a median of >0.10 μm and an aspect ratio of <5 and whose specific surface area is ≤10 $m^2$/g and whose bulk density is >550 g/L is removed from the process, while the remaining proportion is suspended again in the aqueous solvent or dispersant in method step a) in order to then undergo the repeated method steps b) to e).

One of the reactants of the method according to the invention is phosphoric acid ($H_3PO_4$). In certain embodiments, the phosphoric acid used is dilute phosphoric acid with a concentration of 5 to 25 vol. % phosphoric acid in water. Low phosphoric acid concentrations favour the growth on the start particles but at the same time lead to larger volumes of the reaction mixture. In certain embodiments, the concentration of phosphoric acid used is therefore in the range of 10 to 25 vol. % phosphoric acid in water, more preferably in the range of 15 to 25 vol. % phosphoric acid in water.

The second reactant of the method according to the invention is lime milk (suspension of $Ca(OH)_2$ in water). In certain embodiments of the invention, the oxide-based lime milk has a concentration of 2 to 20 wt % based on the total weight of $Ca(OH)_2$ and water. More preferably, the lime milk has a concentration of 8 to 12 wt %.

The third reactant of the method according to the invention is a magnesium compound. If the magnesium compound is added in a solvent or dispersant, the oxide-based compound has a concentration of 2 to 20 wt % based on the total weight of magnesium compound and solvent or dispersant. More preferably, the magnesium compound has a concentration of 8 to 12 wt %.

The invention also relates to a phosphate-containing anti-corrosion pigment that can be obtained by the method according to the invention, wherein said phosphate-containing anti-corrosion pigment has less than ≤1 atom % of metals with a density >5 g/cm³. This corresponds to the definition of a "heavy metal" according "Fachkundebuch Metall", 56th edition, Europa Lehrmittel, p. 268: Table 1: Classification of non-ferrous metals. This includes, for example, copper, iron, or zinc. Due to environmental aspects, the content of such metals in the phosphate-containing anti-corrosion pigment must be kept as low as possible.

In a preferred embodiment of the invention, the content of metals having a density >5 g/cm³ is ≤0.5 atom %, particularly preferably ≤0.2 atom %, and most preferably ≤0.1 atom %.

As already stated, since chlorine and sulphate ions accelerate the corrosion process of metal components, the content of these ions in the phosphate-containing anti-corrosion pigment must also be kept as low as possible.

In a preferred embodiment of the invention, the weight proportion of chlorine of the phosphate-containing anti-corrosion pigment is therefore ≤1000 ppm, preferably ≤500 ppm, more preferably ≤300 ppm, and most preferably ≤150 ppm.

In a preferred embodiment of the invention, the weight proportion of sulphate of the phosphate-containing anti-corrosion pigment is ≤1000 ppm, preferably ≤500 ppm, more preferably ≤300 ppm, and most preferably ≤150 ppm.

In a preferred embodiment of the invention, the added weight proportion of chlorine and sulphate of the phosphate-containing anti-corrosion pigment is ≤1000 ppm, preferably ≤ 500 ppm, more preferably ≤300 ppm, and most preferably ≤150 ppm.

The weight proportion of chlorine and sulphate of the phosphate-containing anti-corrosion pigment can be controlled via the added chlorine and/or sulphate content of start particles, lime milk, magnesium compound, and phosphoric acid. The chlorine and sulphate contents can be determined via common elemental analysis techniques, such as atomic absorption spectrometry (AAS) or X-ray fluorescence analysis (XRF).

In a preferred embodiment of the invention, the total magnesium proportion of the dried phosphate-containing oxide-based anti-corrosion pigment is 2-15 wt %, more preferably 2-9 wt %, even more preferably 3-8 wt %, most preferably 4-7 wt %. In the present case, "dried" means a residual water content of ≤1 wt %. The magnesium in the phosphate-containing anti-corrosion pigment has a higher water solubility than calcium and therefore ensures that the phosphate layer protecting the component can form more quickly in the coating. It is therefore advantageous that the total magnesium proportion of the phosphate-containing anti-corrosion pigment is at least 2 wt %, preferably at least 3 wt %, even more preferably at least 4 wt %, and most preferably at least 5 wt %.

In a preferred embodiment of the invention, the start particle has a magnesium proportion expressed in MgO of <2 wt %, preferably <1 wt %, whereas the total magnesium proportion of the phosphate-containing oxide-based anti-corrosion pigment (MgO) is 2-15 wt %. The grown calcium-magnesium-phosphate layer consequently has a higher proportion of magnesium than the start-particle core. This results in the pigment becoming porous less quickly upon reaction with water than is the case with a pigment that also has an even distribution of magnesium within the core of the particle.

However, in order to enable the most long-term protection possible of the metallic component, the proportion of magnesium should also not be too high since a significant part of the phosphate-containing anti-corrosion pigment would otherwise have too high a water solubility, and a considerable part of the effect of the phosphate-containing anti-corrosion pigment would thus be depleted promptly.

It is therefore advantageous that the total magnesium proportion of the phosphate-containing anti-corrosion pigment is at most 10 wt %, preferably at most 8 wt %, more preferably at most 7 wt %, and most preferably at most 5 wt %.

During the solution or dispersion process of the phosphate-containing anti-corrosion pigment, the molecules of the solvent or dispersant are adsorbed at the surface. It follows that with increasing specific surface area, more solvent or dispersant is necessary to dissolve or disperse the same amount of phosphate-containing anti-corrosion pigment in the solvent or dispersant. That is to say, as the specific surface area of the phosphate-containing anti-corrosion pigment increases, the oil absorption value increases.

Since low oil absorption values are desired for the use of the phosphate-containing anti-corrosion pigment, the specific surface area of the phosphate-containing anti-corrosion pigment in a preferred embodiment of the invention is ≤50 m²/g, preferably ≤40 m²/g, more preferably ≤30 m²/g, and most preferably ≤20 m²/g.

In a preferred embodiment of the invention, the oil absorption value determined according to DIN EN ISO 787-5 is ≤40 g/100 g, preferably ≤30 g/100 g, more preferably ≤25 g/100 g, and most preferably ≤20 g/100 g.

The general test procedure for pigments and fillers according to DIN EN ISO 787-5 was carried out to determine the oil absorption value.

The invention furthermore relates to the use of a phosphate-containing anti-corrosion pigment according to claims 11 to 14 for passive corrosion protection of metal components. According to the invention, "passive corrosion protection" refers to all measures that achieve a shielding effect against corrosive media. Within the scope of the invention, this in particular refers in this context to the finish or coating of a material with a coating material comprising the phosphate-containing anti-corrosion pigment.

In a preferred embodiment of the invention, the phosphate-containing anti-corrosion pigment is used for passive corrosion protection of a motor vehicle, of a ship, or of bridge constituents.

The invention furthermore relates to the use of a phosphate-containing anti-corrosion pigment comprising calcium-magnesium-phosphate particles having a specific surface area ≤50 m²/g, preferably ≤30 m²/g. The primary particles of this calcium-magnesium phosphate preferably have a median of >0.10 μm, even more preferably of >0.15 μm, particularly preferably of >0.20 μm, and most preferably of >0.25 μm. Preferably, the primary particles have an aspect ratio of <5 and/or a bulk density of >550 g/L.

The magnesium proportion of the phosphate-containing oxide-based anti-corrosion pigment based on the dried phosphate-containing anti-corrosion pigment is >10 wt %, preferably >11 wt %, more preferably 12 wt %, and most preferably 13 wt %, wherein "dried" is understood to mean a residual water content of ≤1 wt %.

The invention also relates to the use of hydroxyapatite as a phosphate-containing anti-corrosion pigment.

The invention furthermore relates to the use of a phosphate-containing anti-corrosion pigment comprising calcium-magnesium-phosphate particles, wherein the oxide-based magnesium proportion of the phosphate-containing anti-corrosion pigment based on the dried phosphate-containing anti-corrosion pigment is >10 wt %, preferably >11 wt %, more preferably 12 wt %, and most preferably 13 wt %, wherein "dried" is understood to mean a residual water content of ≤1 wt %.

The present invention also relates to a method for producing a phosphate-containing plastic additive, to the phosphate-containing plastic additive obtainable by this method, and to the use of the phosphate-containing plastic additive to reduce surface defects in plastic materials.

Additives are regularly added to plastic materials in order to inter alia improve the mechanical properties and the surface properties of the polymer. For example, it is known that surface defects occurring after injection moulding, such as so-called silver strips, can be reduced by the addition of metal phosphates, in particular zinc phosphates.

Silver strips are produced by small amounts of gases in the plastic melt, which are caused by air during the infiltration of the plastic granules, by chemical or physical reactions during melting, or by moist material. During injection moulding, the gas bubbles reach the flow front of the plastic in the centre of the flow channel. As the pressure decreases more and more towards the flow front, the gas bubbles become larger. At the flow front itself, normal pressure initially prevails; the bubbles burst there, are rolled off the cold tool wall and stretched. This leads (depending on the colour of the plastic) to silvery and U-shaped streaks arranged against the flow direction.

However, the use of these heavy-metal-containing plastic additives is increasingly restricted due to ecological concerns, in particular due to the water toxicity of the compounds, so that there were already initial efforts to provide plastic additives that contain lower amounts of heavy metals or are even free of heavy metals. Moreover, heavy metal compounds often act as catalysts, which accelerate the decomposition of the polymer materials at the high plastics processing temperatures. This leads to a significant reduction in mean molar mass and to a deterioration of mechanical properties.

In light of the above, the object of the present invention is to provide a composition that contains a phosphate-containing plastic additive and has better mechanical properties and/or surface properties, in particular fewer surface defects after processing, and in which, in contrast to the compositions known from the prior art, decomposition of the plastic material during processing occurs to no or only a lesser degree.

The object of the present invention is achieved by a composition according to aspect 13. The calcium-magnesium phosphate contained in the composition reduces the number of surface defects, in particular the number of so-called silver strips. Without being bound to this theory, the inventors assume that the calcium-magnesium phosphates contained in the composition bind gas bubbles in the plastic melt particularly well, thereby preventing the formation of larger bubbles, so that silver strips are not produced. This effect is particularly pronounced when the calcium-magnesium phosphate is produced by a method comprising the following steps:

A) providing hydroxyapatite or calcium-magnesium-phosphate particles or mixtures of the aforementioned as start particles in an aqueous solvent or dispersant, B) adding lime milk, a magnesium compound, and phosphoric acid to the aqueous solvent or dispersant in order to produce a reaction mixture, C) reacting the reaction mixture to form the phosphate-containing plastic additive
at a temperature in the range of 20° C. to 105° C. and
at a pH value in the range of 5.0 to 13.0, preferably 6.0 to 13.0, D) separating at least a part of the phosphate-containing plastic additive from the aqueous solvent or dispersant, E) Optionally: drying the phosphate-containing plastic additive.

The inventors assume that the particularly even distribution of magnesium and calcium in the particles produced according to the method according to the invention are responsible for the advantageous properties. In particular, it is assumed that the interaction of calcium and magnesium is particularly effective in order to avoid the formation of larger bubbles in the plastic melt.

Moreover, since the phosphate-containing plastic additives according to the invention do not comprise heavy metals, no or only a lesser change in the molecular weight and/or decomposition during plastics processing is observed. Incidentally, the phosphate-containing plastic additives are of a lesser ecological concern.

Step A)

In the first step of the reaction, hydroxyapatite particles or calcium-magnesium-phosphate particles or mixtures of the aforementioned are provided as start particles in an aqueous solvent or dispersant. The term "hydroxyapatite" includes powdered materials comprising at least 95 wt % of $Ca_5(PO_4)_3OH$, as well as calcium-deficient hydroxyapatite, i.e., powdered materials comprising at least 95 wt % of material of the formula $Ca_{10-x}(PO_4)_{6-x}(HPO_4)_x(OH)_{2-x}$, where $0<x≤2$. The term thus includes not only powders whose particles consist of 100 wt % of pure hydroxyapatite and/or pure calcium-deficient hydroxyapatite but also powders that, for example, comprise a proportion of mixed crystals of pure or pure calcium-deficient hydroxyapatite with, e.g., dolomite, as long as the total proportion of $Ca_5(PO_4)_3OH$ and/or $Ca_{10-x}(PO_4)_{6-x}(HPO_4)_x(OH)_{2-x}$, where $0<x≤2$, is at least 95 wt % of the powder.

Preferred hydroxyapatite powders according to the present invention consist of at least 95 wt %, preferably at least 97 wt %, more preferably at least 98 wt %, or most preferably at least 99 wt % of $Ca_5(PO_4)_3OH$ and/or $Ca_{10-x}(PO_4)_{6-x}(HPO_4)_x(OH)_{2-x}$, where $0<x≤2$.

The start particle serves as a crystal nucleus on which the reaction product of reaction step C) grows as a calcium-magnesium-phosphate layer. Prior to growing, the start particles generally have a grain size median <0.1 μm, a bulk density in the range of 200 to 350 g/L, an aspect ratio >5, and a specific surface area in the range of 15 to 50 m²/g.

The grain size median may be determined using laser scatter analysis in accordance with DIN ISO 13320-1. The aspect ratio expressing the ratio of the largest average extent of the particles in a first dimension to the smallest average extent of the particles in a second dimension may be determined by optical analysis. In this case, the largest extent of the particles in a first dimension and the smallest extent of the particles in a second dimension are measured for a fraction of the powder under the scanning electron microscope and the statistical mean (arithmetic mean) of the respective values are used to form the ratio.

In a preferred embodiment of the invention, the start particles are provided in the solvent or dispersant at a concentration that is >10 wt %, more preferably >15 wt %, even more preferably >20 wt %, and most preferably >25 wt %. A high concentration of start particles ensures that the proportion of phosphate-containing plastic additive that arises in step C) by growing on the start particles and not by free precipitation in the solvent or dispersant is as high as possible. As a result, the advantages associated with the invention can be maximized.

Based on its total weight, the aqueous solvent or dispersant comprises at least 20% water, preferably at least 40%, particularly preferably at least 50%, more preferably at least 70%, and most preferably at least 90%. In a further embodiment, the aqueous solvent or dispersant consists of water. The solvent or dispersant may comprise, as a further constituent, polar organic solvents, such as (polyvalent) alcohols or amines. Particularly preferred as further constituents are polyvalent alcohols.

The specific surface area can be determined by BET measurement based on the absorption of nitrogen in accordance with DIN ISO 9277.

Step B)

According to the present invention, in method step B), the lime milk, the magnesium compound, and the phosphoric acid can be added sequentially, wherein the time interval when adding the reactants should be as low as possible.

Preferably, lime milk, magnesium compound, and phosphoric acid are added at least partially simultaneously to the aqueous solvent or dispersant, wherein the magnesium compound is preferably added dissolved or suspended in an aqueous solvent or dispersant. This allows for an even distribution of calcium and magnesium in the calcium-magnesium-phosphate layer grown on the hydroxyapatite start particle. Particularly preferred is the nearly entirely simultaneous addition of lime milk, magnesium compound, and phosphoric acid. This means that ≥95% of the masses of the respective components added in step B) are added simultaneously.

In one embodiment of the invention, the addition in step B) can take place by the lime milk, magnesium compound, and phosphoric acid being each separately added to the suspension of start particles. In this case, the magnesium compound is particularly preferably added as an aqueous dispersion. The addition preferably takes place at least partially or even nearly entirely simultaneously. In this context, nearly entirely simultaneously means that ≥95% of the added masses of the respective components are added simultaneously.

In a further embodiment of the invention, the magnesium compound is dissolved or suspended in the lime milk prior to the addition to the suspension of start particles, so that lime milk and magnesium compound are added together to the suspension of start particles. This ensures an even distribution of calcium and magnesium in the calcium-magnesium-phosphate layer, grown on the start particle, in the plastic additive.

In a further embodiment of the invention, the magnesium compound is dissolved or suspended in the phosphoric acid prior to the addition to the suspension of start particles, so that magnesium compound and phosphoric acid are added together to the suspension of start particles. This has the advantage that the magnesium compound is already evenly distributed during the addition to the suspension of the start particles, so that there is an even distribution of calcium and magnesium in the calcium-magnesium-phosphate layer grown on the start particle.

In a further embodiment of the invention, the lime milk is dissolved or suspended in the phosphoric acid prior to the addition to the suspension of start particles, so that lime milk and phosphoric acid are added together to the suspension of start particles. This has the advantage that the magnesium compound is already evenly distributed during the addition to the suspension of the start particles, so that there is an even distribution of calcium and magnesium in the calcium-magnesium-phosphate layer grown on the start particle.

Step C)

The reaction of the lime milk with the phosphoric acid should be as even and controlled as possible. For the success of the present invention, it is therefore critical that the temperature in the reaction mixture is above 20° C. and below 105° C. In preferred embodiments of the invention, the reaction in step C) takes place at a temperature in the range of 60 to 105° C., preferably in the range of 80 to 105° C., more preferably in the range of 90 to 105° C., and most preferably in the range of 100 to 105° C.

For the success of the present invention, it is also critical that the pH value is in the range of 5.0 to 13.0, preferably 6.0 to 13.0. At a pH value <5.0, calcium hydrogen phosphate ($CaHPO_4$) or calcium hydrogen phosphate dihydrate ($CaHPO_4 \cdot 2\, H_2O$) precipitates. In a preferred embodiment of the invention, the pH value in step C) is in the range of 7.0 to 11.0 since $Ca(OH)_2$ can increasingly occur as a minor phase under certain conditions above pH 11.0. In an alternative embodiment of the invention, step C) takes place at a pH value in the range of 7.0 to 9.0 since inclusions of $Ca(OH)_2$ can at least partially occur under certain conditions above pH 9.0.

In a certain embodiment of the invention, the reaction in step C) is carried out at atmospheric pressure. If desired, however, the work can be done even at slightly increased pressure, preferably up to a positive pressure of 1 bar.

Step D)

In step D) of the method according to the invention, at least a part of the phosphate-containing plastic additive is separated from the suspension. This can be done using common separation methods. Particularly preferably, the separation method is selected from the group consisting of filtration, evaporation, centrifugation, sedimentation, and flotation.

In a preferred embodiment of the invention, the separated phosphate-containing plastic additive is washed with water or an aqueous solvent.

Step E)

In step E), the phosphate-containing plastic additive separated from the suspension is dried. This can take place using common drying methods preferably selected from the group consisting of convective drying, microwave drying, spray drying, or vacuum drying.

The advantages claimed for the present invention are already achieved if the method steps A) to D) or A) to E) are repeated only once. However, even better results can be achieved if these method steps are repeated at least twice, preferably at least three times, and most preferably at least five times.

In a preferred embodiment of the invention, the aspect ratio of the primary particles of the phosphate-containing plastic additive is <5, preferably <4, particularly preferably <3, and most preferably <2.

By repeating the growing step several times, a higher degree of growing is achieved, i.e., the proportion of start particles in the total proportion of the phosphate-containing plastic additive is reduced and the advantages according to the invention are enhanced.

In a preferred embodiment of the invention, the method steps A) to D) or A) to E) are repeated until the proportion of start particles in the phosphate-containing plastic additive is <50 wt %, preferably <40 wt %, more preferably <30 wt %, and most preferably <25 wt %. Particularly preferred is this repetition if the start particles consist of hydroxyapatite or have a weight proportion of hydroxyapatite >50%, preferably >70%, more preferably >80%, and most preferably >90%.

In a preferred embodiment of the invention, the magnesium compound is selected from the group consisting of magnesium oxide, hydroxide, carbonate, or phosphate, wherein phosphate also comprises condensed phosphates, pyrophosphates, and condensed pyrophosphates.

In a preferred embodiment of the invention, the added chlorine and/or sulphate content of hydroxyapatite start particles, lime milk, magnesium compound, and phosphoric acid is ≤1000 ppm, preferably ≤500 ppm. Chlorine and sulphate ions can negatively affect the mechanical plastic material, for example by disrupting the crystallization of semi-crystalline thermoplastics. The content of chlorine and sulphate ions in the phosphate-containing plastic additive is therefore to be kept as low as possible.

In one embodiment of the invention, the method is carried out in semi-continuous operation, wherein that proportion of the phosphate-containing plastic additive separated in method step D) that in the dried state has a median of the primary particles of >0.10 µm is always removed from the process, while the remaining proportion is again suspended in the aqueous solvent or dispersant in method step A).

In an alternative embodiment of the invention, the method is carried out in fully continuous operation, wherein in method step D), that proportion of phosphate-containing plastic additive that in the dried state has a median of the primary particles of >0.10 µm is continuously separated and removed from the method cycle, while the remaining proportion continues to remain in the method cycle. The continuous separation and removal preferably takes place with a lamella thickener or a centrifuge (e.g.: inverting centrifuge or pusher centrifuge).

In a certain embodiment, start particles with a median of <0.1 µm are used in method step A) and method steps A) to D) or A) to E) are repeated at least once in order to obtain a phosphate-containing plastic additive whose primary particles have a median of >0.10 µm and an aspect ratio of <5.

In a certain embodiment of the invention, the method is carried out in continuous operation, wherein a proportion of the phosphate-containing plastic additive separated in method step D) whose primary particles have a median of >0.10 µm and an aspect ratio of <5 is removed from the process, while the remaining proportion is suspended again in the aqueous solvent or dispersant in method step A) in order to then undergo the repeated method steps B) to E).

One of the reactants of the method according to the invention is phosphoric acid ($H_3PO_4$). In certain embodiments, the phosphoric acid used is dilute phosphoric acid with a concentration of 5 to 25 vol. % phosphoric acid in water. Low phosphoric acid concentrations favour the growth on the start particles but at the same time lead to larger volumes of the reaction mixture. In certain embodiments, the concentration of phosphoric acid used is therefore in the range of 10 to 25 vol. % phosphoric acid in water, more preferably in the range of 15 to 25 vol. % phosphoric acid in water.

The second reactant of the method according to the invention is lime milk (suspension of $Ca(OH)_2$ in water). In certain embodiments of the invention, the oxide-based lime milk has a concentration of 2 to 20 wt % based on the total weight of $Ca(OH)_2$ and water. More preferably, the lime milk has a concentration of 8 to 12 wt %.

The third reactant of the method according to the invention is a magnesium compound. If the magnesium compound is added in a solvent or dispersant, the oxide-based compound has a concentration of 2 to 20 wt % based on the total weight of magnesium compound and solvent or dispersant. More preferably, the magnesium compound has a concentration of 8 to 12 wt %.

The invention also relates to a phosphate-containing plastic additive that can be obtained by the method according to the invention, wherein said phosphate-containing anti-corrosion pigment has less than ≤1 atom % of metals with a density >5 $g/cm^3$. This corresponds to the definition of a "heavy metal" according to "Fachkundebuch Metall", 56th edition, Europa Lehrmittel, p. 268: Table 1: Classification of non-ferrous metals. This includes, for example, copper, iron, or zinc. Due to environmental aspects, the content of such metals in the phosphate-containing plastic additive must be kept as low as possible.

In a preferred embodiment of the invention, the content of metals having a density >5 $g/cm^3$ is ≤0.5 atom %, particularly preferably ≤0.2 atom %, and most preferably ≤0.1 atom %.

As already stated, since chlorine and sulphate ions can disrupt the mechanical properties of the plastic material, the content of these ions in the phosphate-containing plastic additive must also be kept as low as possible.

In a preferred embodiment of the invention, the weight proportion of chlorine of the phosphate-containing plastic additive is therefore ≤1000 ppm, preferably ≤500 ppm, more preferably ≤300 ppm, and most preferably ≤150 ppm.

In a preferred embodiment of the invention, the weight proportion of sulphate of the phosphate-containing plastic additive is ≤1000 ppm, preferably ≤500 ppm, more preferably ≤300 ppm, and most preferably ≤150 ppm.

In a preferred embodiment of the invention, the added weight proportion of chlorine and sulphate of the phosphate-containing plastic additive is ≤1000 ppm, preferably ≤500 ppm, more preferably ≤300 ppm, and most preferably ≤150 ppm.

The weight proportion of chlorine and sulphate of the phosphate-containing plastic additive can be controlled via the added chlorine and/or sulphate content of start particles, lime milk, magnesium compound, and phosphoric acid. The chlorine and sulphate contents can be determined via common elemental analysis techniques, such as atomic absorption spectrometry (AAS) or X-ray fluorescence analysis (XRF).

In a preferred embodiment of the invention, the total magnesium proportion of the dried phosphate-containing oxide-based plastic additive is 2-15 wt %, more preferably 2-9 wt %, even more preferably 3-8 wt %, most preferably 4-7 wt %. In the present case, "dried" means a residual water content of ≤1 wt %. The magnesium in the phosphate-containing plastic additive has a higher water solubility than calcium and therefore ensures that the phosphate layer protecting the component can form more quickly in the coating. It is therefore advantageous that the total magnesium proportion of the phosphate-containing plastic additive is at least 2 wt %, preferably at least 3 wt %, more preferably at least 4 wt %, and most preferably at least 5 wt %.

In a preferred embodiment of the invention, the start particle has a magnesium proportion expressed in MgO of <2 wt %, preferably <1 wt %, whereas the total magnesium proportion of the phosphate-containing oxide-based plastic additive (MgO) is 2-15 wt %. The grown calcium-magnesium-phosphate layer consequently has a higher proportion of magnesium than the start-particle core. This results in the pigment becoming porous less quickly upon reaction with water than is the case with a pigment that also has an even distribution of magnesium within the core of the particle.

However, in order to enable the most long-term protection possible of the metallic component, the proportion of magnesium should also not be too high since a significant part of the phosphate-containing plastic additive would otherwise have too high a water solubility, and a considerable part of the effect of the phosphate-containing plastic additive would thus be depleted promptly.

It is therefore advantageous that the total magnesium proportion of the phosphate-containing plastic additive is at most 10 wt %, preferably at most 8 wt %, more preferably at most 7 wt %, and most preferably at most 5 wt %.

The magnesium proportion of the phosphate-containing oxide-based plastic additive based on the dried phosphate-containing plastic additive is >10 wt %, preferably >11 wt %, more preferably 12 wt %, and most preferably 13 wt %, wherein "dried" is understood to mean a residual water content of ≤1 wt %.

The invention also relates to a composition comprising a polymeric material and a phosphate-containing plastic additive comprising calcium-magnesium-phosphate particles, wherein the composition comprises the phosphate-containing plastic additive in an amount of at most 10 wt %, preferably 5 wt %, more preferably 2 wt %, still more preferably 1 wt %, and most preferably by 0.5 wt % of the composition. Particularly preferably, the composition comprises the phosphate-containing plastic additive in an amount of 10 to 0.01 wt %, preferably 5 to 0.05 wt %, more preferably 2 to 0.1 wt %, and most preferably 1 to 0.1 wt %, based on the weight of the entire composition. A lower proportion of phosphate-containing plastic additive has the advantage that the mechanical properties of the plastic are only insignificantly influenced by the phosphate-containing plastic additive.

The polymeric material is preferably selected from the group consisting of polyvinyl butyral (PVB), polypropylene (PP), polyethylene (PE), polyamide (PA), polyester, such as polybutylene terephthalate (PBT), polyethylene terephthalate (PET), polyurethane (PU), polyurea, polyphenylene oxide, polyacetal, polyacrylate, polymethacrylate, polyoxymethylene, polyvinyl acetal, polystyrene, acryl-butadiene styrene (ABS), acrylonitrile styrene acrylic ester (ASA), polyacetals, such as polyoxymethylene (POM), polycarbonate, polyether sulfone, polysulphonate, polytetrafluoroethylene, polyurea, formaldehyde resins, melamine resins, polyether ketone, polyvinylchloride, polylactic acid, polysiloxane, phenolic resins, epoxy resins, poly(imide), bismaleimide triazin, thermoplastic polyurethane, ethylene-vinyl acetate copolymer (EVA), copolymers and/or mixtures of the aforementioned polymers.

Particularly preferably, the polymeric material is a polyacetal, particularly strongly preferred polyoxymethylene (POM).

The invention also relates to the use of hydroxyapatite as a phosphate-containing plastic additive.

The phosphate-containing plastic additive can be introduced into the polymeric material by various methods. First of all, the phosphate-containing plastic additive can be incorporated into the polymeric material during the moulding process. If the polymeric material is processed by extrusion, for example, the phosphate-containing plastic additive can be added during the extrusion process, e.g., by means of a masterbatch. A masterbatch within the meaning of the present invention is a polymeric material, containing the phosphate-containing plastic additive I and the possibly further additives in concentrations that are higher than in the final application, in the form of granules or powder. In order to produce the polymeric material according to the invention, the masterbatch or various masterbatches are combined with further polymeric material without the phosphate-containing plastic additive contained in the masterbatch, in quantities or ratios that correspond to the desired concentrations of the flame retardant in the final product. Compared to the addition of various substances in the form of pastes, powders, or liquids, masterbatches have the advantage that they ensure a high level of process safety and are very well suited for processing and dosing. As a result of the extrusion, the phosphate-containing plastic additive is evenly distributed in the polymeric material.

The invention furthermore relates to the use of a phosphate-containing plastic additive comprising calcium-magnesium-phosphate particles to reduce surface defects in plastic materials obtained by a plastics processing method.

Aspect 1: Method for producing a phosphate-containing plastic additive, comprising the following steps:
A) providing hydroxyapatite or calcium-magnesium-phosphate particles or mixtures of the aforementioned as start particles in an aqueous solvent or dispersant,
B) adding lime milk, a magnesium compound, and phosphoric acid to the aqueous solvent or dispersant in order to produce a reaction mixture,
C) reacting the reaction mixture to form the phosphate-containing plastic additive
at a temperature in the range of 20° C. to 105° C. and
at a pH value in the range of 5.0 to 13.0, preferably 6.0 to 13.0,
D) separating at least a part of the phosphate-containing plastic additive from the aqueous solvent or dispersant,
E) Optionally: drying the phosphate-containing plastic additive.

Aspect 2: Method according to the first aspect, characterised in that the method steps A) to D) are repeated at least once, preferably at least three times so that a method cycle is created, wherein in method step A), instead of the hydroxyapatite particles, either
1) the part of the phosphate-containing plastic additive that is separated from the aqueous solvent or dispersant in method step D), or
2) the part of the phosphate-containing plastic additive that remains in the aqueous solvent or dispersant in method step D) is used as the starting particle.

Aspect 3: Method according to any one of the preceding aspects, characterised in that the magnesium compound is selected from the group consisting of magnesium oxide, hydroxide, carbonate, or phosphate.

Aspect 4: Method according to any one of the preceding aspects, characterised in that prior to step B), the magnesium compound is dissolved or dispersed in the phosphoric acid.

Aspect 5: Method according to any one of the preceding aspects, characterised in that the reaction in step C) takes place at a temperature in the range of >90° C., preferably >100° C.

Aspect 6: Method according to any one of the preceding aspects, characterised in that the added chlorine and/or sulphate content of hydroxyapatite start particles, lime milk, magnesium compound, and phosphoric acid is ≤500 ppm.

Aspect 7: Method according to any one of the preceding aspects, characterised in that the method is carried out either
$F^1$) in semi-continuous operation, wherein that proportion of the phosphate-containing plastic additive separated in method step D) that in the dried state has a median of the primary particles of >0.10 μm is always removed from the process, while the remaining proportion is again suspended in the aqueous solvent or dispersant in method step A), or F²) in fully continuous operation, wherein in method step D), that proportion of phosphate-containing plastic additive that in the dried state has a median of the primary particles of >0.10 µm is continuously separated and removed from the method cycle, while the remaining proportion continues to remain in the method cycle.

Aspect 8: Method according to any one of the preceding aspects, characterised in that the lime milk, the magnesium compound, and the phosphoric acid in step C) are added at least partially simultaneously.

Aspect 9: Method according to any one of the preceding aspects, characterised in that the phosphoric acid is dilute aqueous phosphoric acid having a concentration of 5-25 vol. %.

Aspect 10: Method according to any one of the preceding aspects, characterised in that the oxide-based lime milk (CaO) has a concentration of 2-20 wt % based on the total weight of the lime milk.

Aspect 11: Phosphate-containing plastic additive obtainable by a method according to any one of aspects 1-10, wherein the phosphate-containing plastic additive preferably comprises ≤1 atom % of metals having a density >5 g/cm³.

Aspect 12: Phosphate-containing plastic additive according to aspect 11, characterised in that the oxide-based magnesium proportion of the dried phosphate-containing plastic additive (MgO) is 2-15 wt %, wherein "dried" is understood to mean a residual water content of ≤1 wt %.

Aspect 13: Composition comprising
a) a polymeric material and
b) a phosphate-containing plastic additive comprising calcium-magnesium phosphate particles,
wherein the composition comprises the phosphate-containing plastic additive in an amount of at most 10 wt %, preferably 5 wt %, based on the weight of the entire composition.

Aspect 14: Composition according to aspect 13, characterised in that it comprises the polymeric material in an amount of at least 50 wt %, preferably at least 70 wt %, particularly preferably at least 80 wt %, and most preferably at least 90 wt % based on the weight of the entire composition.

Aspect 15: Composition according to aspects 13-14, characterised in that the polymeric material is a thermoplastic or thermoset.

Aspect 16: Composition according to aspects 13-15, characterised in that the polymeric material is selected from the group consisting of polyvinyl butyral (PVB), polypropylene (PP), polyethylene (PE), polyamide (PA), polyester, such as polybutylene terephthalate (PBT), polyethylene terephthalate (PET), polyurethane (PU), polyurea, polyphenylene oxide, polyacetal, polyacrylate, polymethacrylate, polyoxymethylene, polyvinyl acetal, polystyrene, acrylbutadiene styrene (ABS), acrylonitrile styrene acrylic ester (ASA), polyoxymethylene (POM), polycarbonate, polyether sulfone, polysulphonate, polytetrafluoroethylene, polyurea, formaldehyde resins, melamine resins, polyether ketone, polyvinylchloride, polylactic acid, polysiloxane, phenolic resins, epoxy resins, poly(imide), bismaleimide triazin, thermoplastic polyurethane, ethylene-vinyl acetate copolymer (EVA), copolymers and/or mixtures of the aforementioned polymers.

Aspect 17: Composition according to any one of aspects 13-16, wherein the phosphate-containing plastic additive is one according to aspects 11-12.

Aspect 18: Use of a phosphate-containing plastic additive to reduce surface defects in plastic materials obtained by a plastics processing method, wherein the phosphate-containing plastic additive comprises hydroxyapatite or calcium-magnesium phosphate particles.

Aspect 19: Use according to aspect 18, wherein the plastics processing method is a master forming or forming process, preferably injection moulding.

Aspect 20: Use according to aspects 18-19, wherein the phosphate-containing plastic additive is one according to aspects 11-12.

Abstract of the invention according to aspects 1-20:
Phosphate-Containing Plastic Additive The present invention relates to a method for producing a phosphate-containing plastic additive, to the phosphate-containing plastic additive obtainable by this method, and to the use of the phosphate-containing plastic additive.

EXAMPLES

The invention will now be explained on the basis of specific embodiments of production examples according to the invention.
Starting Materials:

| Name | Manufacturer | Purity | CAS |
|---|---|---|---|
| Hydroxyapatite start particles | Chemische Fabrik Budenheim KG | ≥90 wt % | 1306-06-5 |
| Lime milk | Chemische Fabrik Budenheim KG | 10 wt % CaO in H₂O | 1305-62-0 |
| Phosphoric Acid | Chemische Fabrik Budenheim KG | ≥75 wt % | 7664-38-2 |
| Mg(OH)₂ | Dr Paul Lohmann GmbH & Co KGaA | ≥98 wt % | 1309-82-0 |

Measurement Methods:
Particle Size Determination, Median, D10, D90

The particle size distributions were determined by dynamic light scattering on the basis of both volume and particle size using a Horiba Partica LA-950V (Horiba, Ltd.; Kyoto; Japan).
Specific Surface Area The specific surface area was determined according to the BET method by N₂ absorption (DIN ISO 9277) using a BELSORP-Mini device from the BEL company. Nitrogen with a purity of 99.999% was used.
Oil Absorption Value The general test procedure for pigments and fillers according to DIN EN ISO 787-5 was carried out to determine the oil absorption value.
Scanning Electron Microscopy (SEM) and Energy-Dispersive X-Ray Spectroscopy (EDX)

The determination of the distribution of elements in the samples was performed by means of scanning electron microscopy (SEM) images and parallel evaluation of the characteristic X-ray radiation (energy-dispersive X-ray spectroscopy, EDX). A Sigma EVO SEM spectrometer from the company Zeiss was used in combination with an INCA Energy 350 EDX detector from the Oxford company. A representation of sections of the surface was created from the individual images (mapping).
Annealing Loss The annealing loss is determined as a mass loss during annealing in relation to the dry mass of the starting base.

The determination took place in accordance with DIN 18128.
General Description of Experiments
Large-Scale Experiment 4,000 L water and 500 kg hydroxyapatite were placed in a reactor vessel A and heated to 70° C. while stirring. In a second vessel B, 654 kg phosphoric acid and 1,500 L water were mixed. In a further vessel C, 4,200 kg lime milk, 500 L water and Mg(OH)$_2$ were mixed, wherein the amount of Mg(OH)$_2$ was selected such that a molar ratio of Ca to Mg of approximately 6:1 is present. The contents of vessels B and C were simultaneously added to reactor vessel A while stirring. The wait time after the addition was completed was 30 min., wherein the reaction mixture was stirred further. Subsequently, the resulting solid was decanted off the mother liquor and a filter press was used to filter off the liquid. Subsequently, the solid was dried up to an annealing loss of <6% and then ground to a grain size with a median less than 3 µm. The obtained particles can be used as start particles in subsequent experiments.

The commercially available calcium-magnesium-phosphate-based anti-corrosion pigment Heucophos® from the Heubach company was used as the comparison material VM1.

TABLE 1

Particle size distributions (measured wet)

| Sample | D90 [µm] | Median [µm] | D10 [µm] |
|---|---|---|---|
| 1 | 10.0 | 5.7 | 2.5 |
| 2 | 10.1 | 5.7 | 2.3 |
| 3 | 10.2 | 5.8 | 2.3 |
| 4 | 10.5 | 5.9 | 2.1 |
| VM1 | 5.5 | 2.4 | 0.5 |

As can be seen from the results, the particle size distributions of the samples according to the invention are significantly shifted towards higher particle sizes.

TABLE 2

XRF analysis results and the theoretical annealing loss calculated therefrom

| Sample | CaO [wt %] | MgO [wt %] | P$_2$O$_5$ [wt %] | Annealing loss [wt %] |
|---|---|---|---|---|
| 1 | 46.2 | 6.3 | 43.4 | 4.1 |
| 2 | 46.5 | 6.1 | 43.3 | 4.1 |
| 3 | 46.8 | 5.9 | 43.3 | 4.0 |
| 4 | 46.7 | 5.9 | 43.2 | 4.2 |
| VM1 | 43.3 | 3.4 | 41.8 | 11.5 |

As can be seen from the results, the samples of the material according to the invention have a lower annealing loss than the comparison material.

TABLE 3

Bulk density, specific surface area according to BET, and relative oil absorption value

| Sample | Bulk density [g/L] | BET [m$^2$/g] | Relative oil absorption value |
|---|---|---|---|
| 1 | 410 | 27.6 | 0.76 |
| 2 | 400 | 26.3 | 0.72 |
| 3 | 460 | 25.6 | 0.70 |
| 4 | 450 | 25.2 | 0.71 |
| VM1 | 310 | 34.8 | 1.00 |

In order to provide good comparability, the oil absorption value was determined relative to the comparison material.

DETAILED DESCRIPTION OF THE FIGURES

Figure 1A:
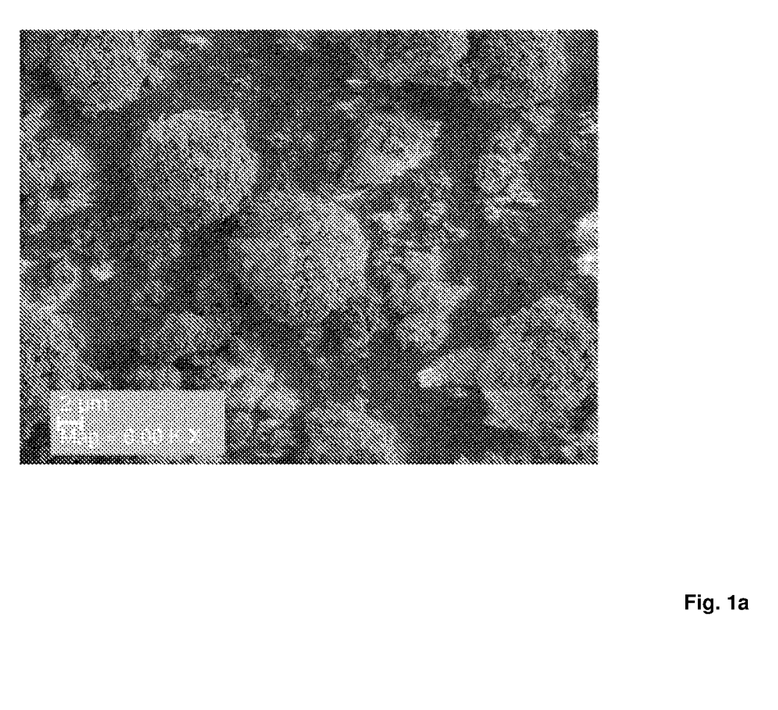
FIG. 1a: Electron microscopy image of sample 1 (acceleration voltage of 1 kV).

FIG. 1a: Shows an electron microscopy image of the inventive sample 1. As can be seen from the illustration, the particles have a spherical shape, wherein the diameter is in the range of 6-10 µm. All subsequent images (FIG. 1b-FIG. 6) were recorded with the same magnification (6,000×) and thus have the same scale as this image.

Figure 1B:
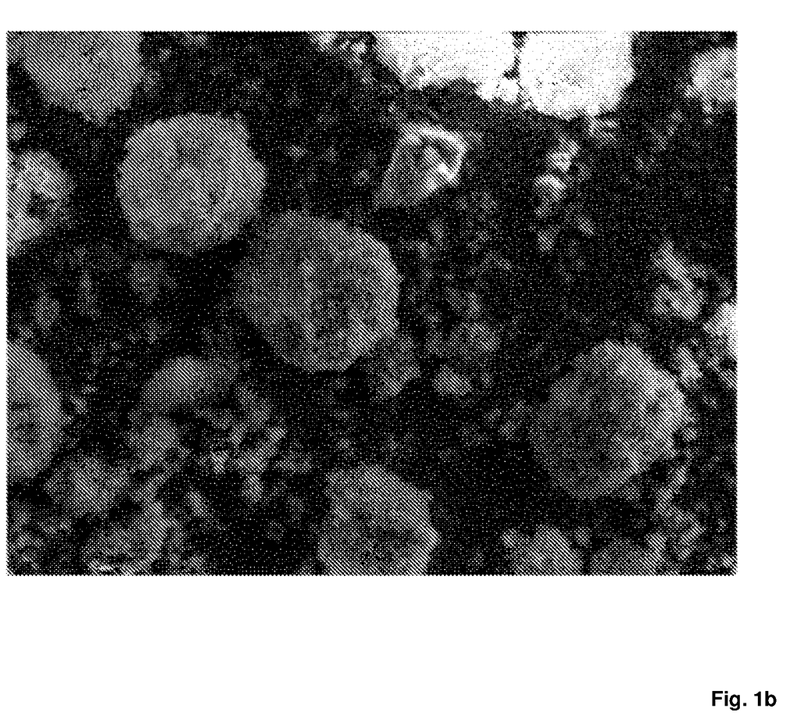
FIG. 1b: Electron microscopy image of sample 1 (acceleration voltage of 10 kV).

FIG. 1b: Shows an electron microscopy image of the inventive sample 1. Same image detail as FIG. 1a but at an acceleration voltage of 10 kV. This acceleration voltage is also used for all subsequent electron microscopy images.

Figure 2:
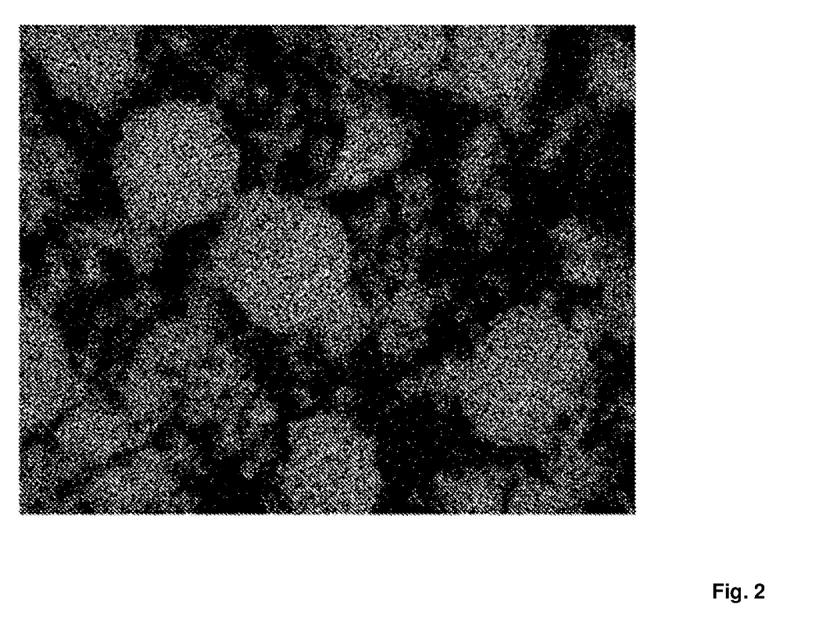
FIG. 2: Mapping of the electron microscopy image of FIG. 1b for the element calcium (element distribution determined by energy-dispersive x-ray spectroscopy).

FIG. 2: The mapping of the electron microscopy image of FIG. 1b for the element calcium shows an even distribution of calcium over the entire particle.

Figure 3:
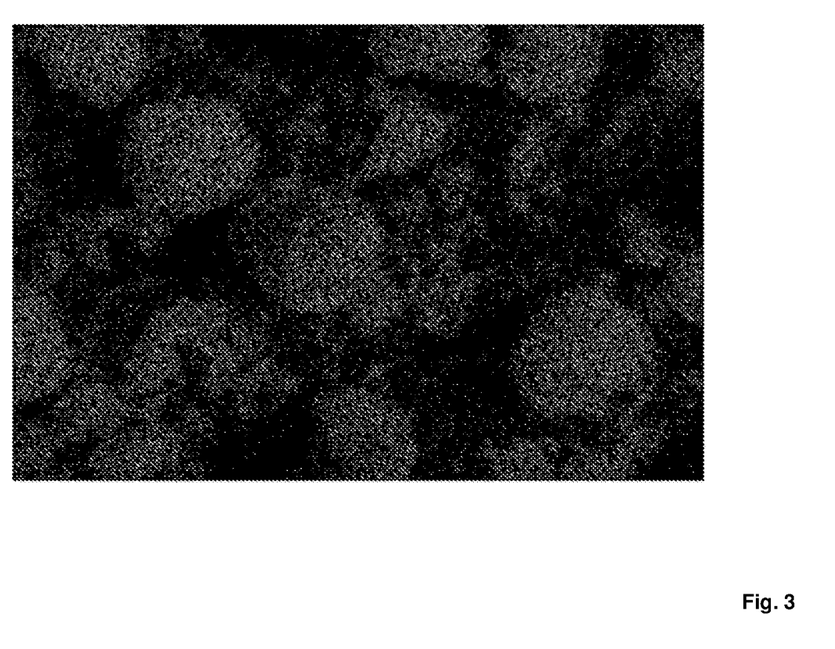
FIG. 3: Mapping of the electron microscopy image of FIG. 1b for the element magnesium (element distribution determined by energy-dispersive x-ray spectroscopy).

FIG. 3: The mapping of the electron microscopy image of FIG. 1b for the element magnesium shows an even distribution of magnesium over the entire particle.

Figure 4:
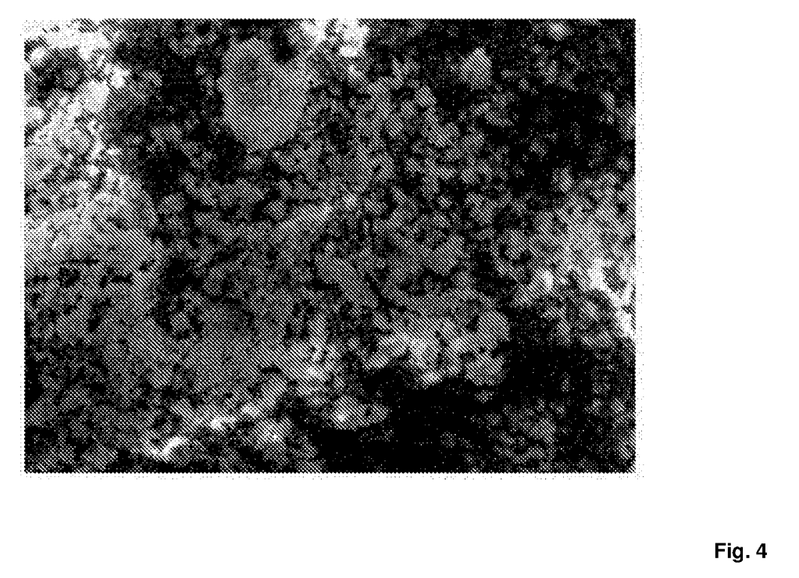
FIG. 4: Electron microscopy image of the comparison sample VM1.

FIG. 4: Shows an electron microscopy image of the comparison sample VM1. As can be seen from the illustration, the particles have a fine crystalline, leaf-like structure.

Figure 5:
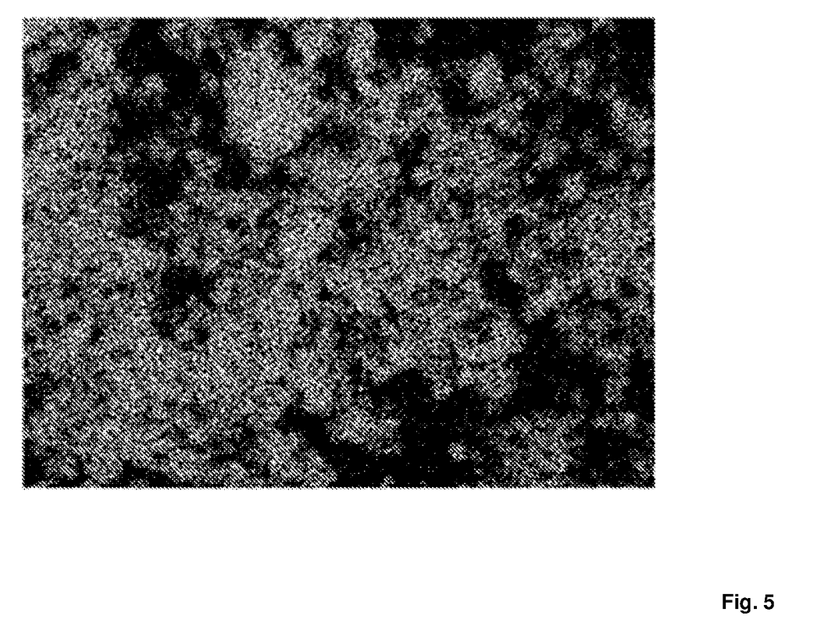
FIG. 5: Mapping of the electron microscopy image of FIG. 4 for the element calcium (element distribution determined by energy-dispersive x-ray spectroscopy).

FIG. 5: The mapping of the electron microscopy image of FIG. 4 for the element calcium shows an even distribution of calcium over the entire particle.

Figure 6:
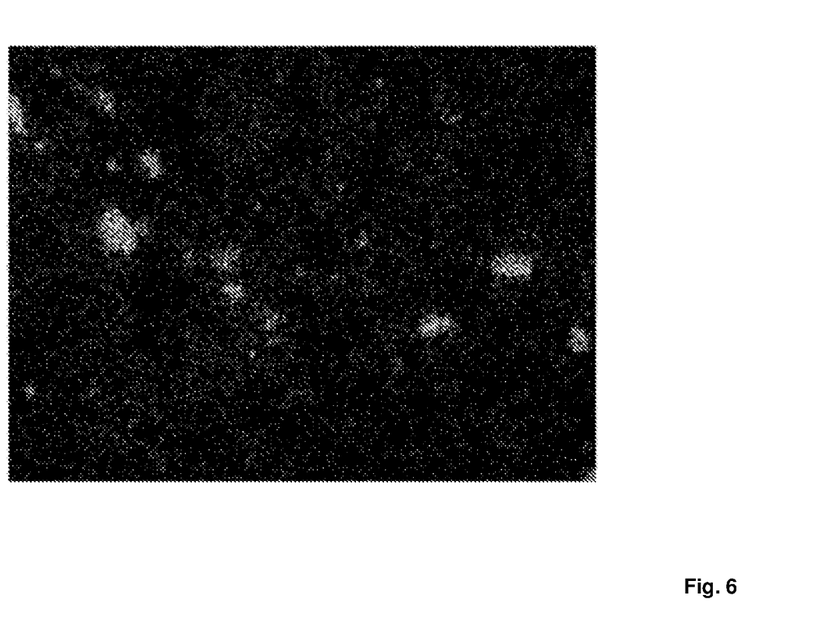
FIG. 6: Mapping of the electron microscopy image of FIG. 4 for the element magnesium (element distribution determined by energy-dispersive x-ray spectroscopy).

FIG. 6: The mapping of the electron microscopy image of FIG. 4 for the element magnesium shows local clusters of the magnesium concentration (particularly brightly pronounced area of the mapping).

The particles obtained from the above production examples and shown in the figures may also be used as a plastic additive, i.e., as exemplary embodiments for the invention according to aspects 1-20.

The invention claimed is:

1. A method for producing a phosphate-containing anti-corrosion pigment, comprising the following steps:
   a) providing hydroxyapatite or calcium-magnesium-phosphate particles or mixtures of the aforementioned as start particles in an aqueous solvent or dispersant,
   b) adding lime milk, a magnesium compound, and phosphoric acid to the aqueous solvent or dispersant in order to produce a reaction mixture,
   c) reacting the reaction mixture to form the phosphate-containing anti-corrosion pigment:
      at a temperature in the range of 20° C. to 105° C. and
      at a pH value in the range of 6.0 to 13.0, d) separating at least a part of the phosphate-containing anti-corrosion pigment from the aqueous solvent or dispersant, and
e) Optionally: drying the phosphate-containing anti-corrosion pigment.

2. The method according to the claim 1, wherein the method steps a) to d) are repeated at least once so that a method cycle is created, and
wherein in method step a), instead of the hydroxyapatite particles, either:
1) The part of the phosphate-containing anti-corrosion pigment that is separated from the aqueous solvent or dispersant in method step d), or
2) The part of the phosphate-containing anti-corrosion pigment that remains in the aqueous solvent or dispersant in method step d)
is used as the starting particle.

3. The method according to claim 1, wherein the magnesium compound is selected from the group consisting of magnesium oxide, hydroxide, carbonate, and phosphate.

4. The method according to claim 1, wherein prior to step b), the magnesium compound is dissolved or dispersed in the phosphoric acid.

5. The method according to claim 1, wherein the reaction in step c) takes place at a temperature in the range of ≥90° C.

6. The method according to claim 1, wherein the added chlorine and/or sulphate content of hydroxyapatite start particles, lime milk, magnesium compound, and phosphoric acid is ≤500 ppm.

7. The method according to claim 1, wherein the method is carried out either:
f$^1$) in semi-continuous operation, wherein that proportion of the phosphate-containing anti-corrosion pigment separated in method step d) that in the dried state has a median of the primary particles of >0.10 μm is always removed from the process, while the remaining proportion is again suspended in the aqueous solvent or dispersant in method step a), or
f$^2$) in fully continuous operation, wherein in method step d), that proportion of phosphate-containing anti-corrosion pigment that in the dried state has a median of the primary particles of >0.10 μm is continuously separated and removed from the method cycle, while the remaining proportion continues to remain in the method cycle.

8. The method according to claim 1, wherein the lime milk, the magnesium compound, and the phosphoric acid in step c) are added at least partially simultaneously.

9. The method according to claim 1, wherein the phosphoric acid is dilute aqueous phosphoric acid having a concentration of 5-25 vol. %.

10. The method according to claim 1, wherein the oxide-based lime milk (CaO) has a concentration of 2-20 wt % based on the total weight of the lime milk.

11. A phosphate-containing anti-corrosion pigment obtainable by the method according to claim 1, wherein the phosphate-containing anti-corrosion pigment comprises ≤1 atom % of metals having a density >5 g/cm$^3$ and in that the oil absorption value determined according to DIN EN ISO 787-5 is ≤40 g/100 g.

12. The phosphate-containing anti-corrosion pigment according to claim 11, wherein the oxide-based magnesium proportion of the dried phosphate-containing anti-corrosion pigment (MgO) is 2-15 wt %, wherein "dried" is understood to mean a residual water content of ≤1 wt %.

13. The phosphate-containing anti-corrosion pigment according to claim 1, wherein the specific surface area is ≤50 m$^2$/g.

14. A method comprising using a phosphate-containing anti-corrosion pigment comprising calcium-magnesium phosphate particles having a specific surface area ≤50 m$^2$/g and an aspect ratio of the primary particles <5 as phosphate-containing anti-corrosion pigment.

* * * * *